Figure 1:
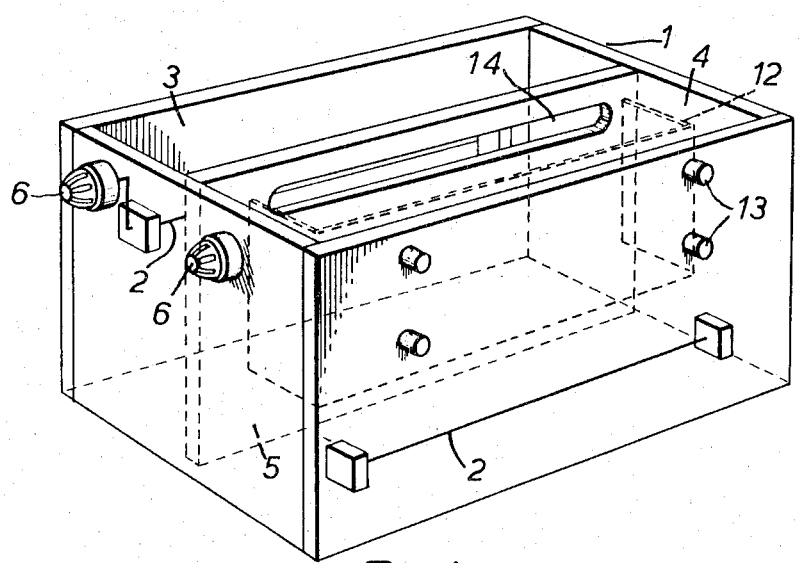

United States Patent [19]
Roberts

[11] 3,856,655
[45] Dec. 24, 1974

[54] VERTICAL GEL ELECTROPHORESIS APPARATUS

[75] Inventor: Peter Clive Buckley Roberts, Buenos Aires, Argentina

[73] Assignee: Bovril Limited, Enfield, Middlesex, England

[22] Filed: Jan. 15, 1973

[21] Appl. No.: 323,426

[52] U.S. Cl............................ 204/299, 204/180 G
[51] Int. Cl........................................... B01d 13/02
[58] Field of Search....................... 204/180 G, 299

[56] References Cited
UNITED STATES PATENTS

| | | | |
|---|---|---|---|
| 3,129,158 | 4/1964 | Raymond et al................ | 204/180 G |
| 3,384,564 | 5/1968 | Ornstein et al................. | 204/180 G |
| 3,563,880 | 2/1971 | Anderson............................ | 204/299 |
| 3,620,947 | 11/1971 | Allen et al....................... | 204/180 G |
| 3,719,580 | 3/1973 | Roberts et al. .................... | 204/299 |

*Primary Examiner*—John H. Mack
*Assistant Examiner*—A. C. Prescott
*Attorney, Agent, or Firm*—Brisebois & Kruger

[57] ABSTRACT

An improved vertical gel electrophoresis apparatus comprises a gel cell vertically disposed in a lower buffer tank, the upper surface of said gel cell defining at least part of the bottom of an upper buffer tank and two electrodes for establishing a potential across said gel cell.

3 Claims, 2 Drawing Figures

PATENTED DEC 24 1974　　　　　　　　　　　3,856,655

VERTICAL GEL ELECTROPHORESIS APPARATUS

This invention relates to improvements in vertical gel, especially acrylamide gel, electrophoresis apparatus.

Electrophoretic separation of electrically charged components of a mixture thereof occurs as a result of migration os such components under the influence of an applied electric field, the charged components migrating with different mobilities towards an oppositely charged electrode. Vertical gel electrophoresis refers to separation on a vertical gel layer saturated with a buffer solution under the influence of an electric field applied across the gel in a vertical direction.

In hitherto proposed vertical electrophoresis apparatus it is customary to use two buffer tanks (termed the 'upper' and 'lower' tanks), each containing an electrode, and a gel cell vertically disposed in the lower tank at such a depth that buffer solution in the lower tank just contacts the lower surface of the gel, the circuit across the gel being completed by a filter paper bridge between the buffer solution in the upper tank and the upper surface of the gel. The use of a filter paper bridge has the serious drawback that it is usually not possible to obtain a uniform electric current along the entire length of the gel. Current uniformity along the entire length of the gel is, of course, essential if it is desired to carry out a comparative separation of the components of a plurality of samples.

The present invention provides a vertical gel electrophoresis apparatus which obviates the need for a filter paper bridge between buffer solution in the upper tank and the upper surface of the gel, and ensures a substantially uniform current along the entire length of the gel, thus enabling a large number of samples to be separated simultaneously and compared accurately. Accordingly the present invention provides a vertical gel electrophoresis apparatus comprising a lower buffer tank in which is vertically disposed a gel cell, an upper buffer tank at least part of the bottom of which upper buffer tank is defined by the upper surface of the gel cell and two electrodes for establishing in use a potential across the gel cell.

A preferred apparatus according to the invention comprises a rectangular buffer tank divided into a first compartment and a second compartment by a partition extending upwardly from the base of the tank and wholly across the tank in a plane parallel to two opposite side walls thereof, the first compartment containing a vertically disposed gel cell and an upper buffer tank defined by four walls, one of the four walls being a portion of the partition, and at least part of the bottom of which upper buffer tank is defined by the upper surface of the gel cell, means for allowing, in use, a buffer solution in the second compartment to overflow into the upper buffer tank and, disposed in each compartment, an electrode for establishing, in use, a potential across the gel cell. The means for allowing, in use, buffer solution in the second compartment to overflow into the upper buffer tank preferably comprises a slotted aperture in the upper region of the partition between said second compartment and the upper buffer tank.

Heat is liberated during electrophetic processes and, therefore it is usually desirable to incorporate into the apparatus of the invention one or more heat exchange elements to maintain a substantially constant gel temperature. For example, there may be provided a heat exchange element adjacent each side of the gel cell of the apparatus of the invention.

Figure 2:
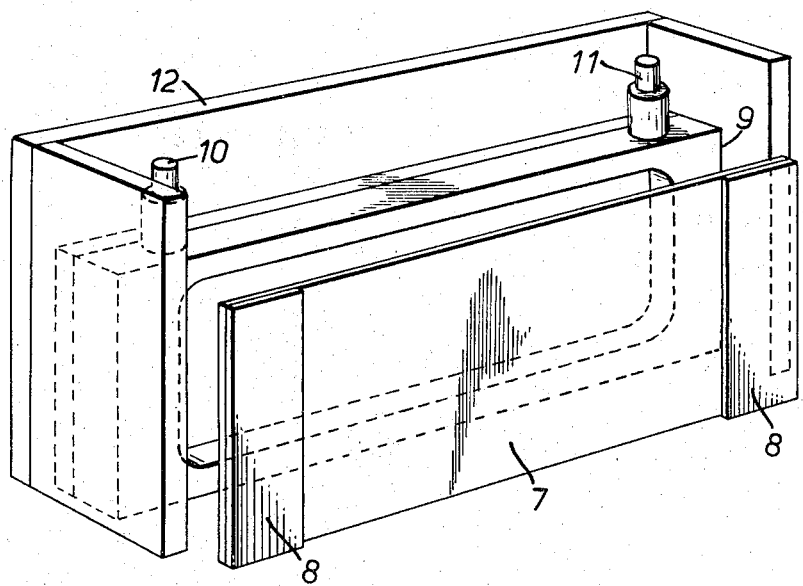

The invention will now be described in more detail, by way of example only, with reference to the accompanying drawings in which FIG. 1 is a perspective view of an apparatus according to the invention but with the gel cell and the upper buffer tank not shown, and FIG. 2 is an exploded perspective view of one half of a gell cell together with a heat exchange element and a cell support bracket, suitable for use in an apparatus of the invention.

Referring to FIG. 1, a vetical gel electrophoresis apparatus in part consists of a rectangular buffer tank 1 divided into two compartments 3 and 4 by a central partition 5 having a slotted aperture 14. Each compartment 3 and 4 is provided with a platinum electrode 2 parallel to the base of the tank 1. The platinum electrodes 2 are connected to external terminal posts 6 by copper leads sheathed within small bore polyethylene tubing.

Referring to FIG. 2, a composite cell consists of two parallel 229 mm × 76 mm × 2.5 mm glass plates 7 (only one of which is shown) spaced apart by two lightly greased glass microscope slides 8 positioned between the plates 7 at the ends thereof. A 2.5 mm spacing between the plates is especially suitable for acrylamide gels and may be formed by using paired microscope slides cemented together with an epoxy resin.

The gel layer may be formed in the cell as follows. The plates 7 and microscope slides 8 are rigidly held together by clamps and the lower open end of the cell is temporarily sealed by a sealant or a casting stand. A suitable casting stand comprises a rigid base plate, having thereon a layer of resilient and impervious material, from which four threaded studs project upwardly arranged so as to allow the cell to fit vertically within them and in a plane perpendicular to the base plate. Two cross members, each drilled to receive two of the studs and which fit over the upper surface of the cell, are adjusted downwards by means of wing-nuts screwed onto the studs so forcing the cell against the layer of resilient and impervious material, whereby the lower end of the cell is sealed. Acrylamide gel monomer is then poured into the cell from its open upper end to a level of about 10 mm from the top of the cell. On completion of polymerisation the clamps and the sealant or casting stand are removed and the cell is ready for use.

A heat exchange element designated generally by reference numeral 9 is formed by milling out a 190 mm × 64 mm × 13 mm section from a 229 mm × 76 mm × 13 mm Perspex (Registered Trade Mark) plate to give a rectangular frame, one face of which is then bonded to a 229 mm × 76 mm × 6.5 mm backing plate. The upper longitudinal member of the frame is drilled to accept a 6.5 mm (outside diameter) coolant inlet and outlet pipes 10 and 11 respectively. The portion of each pipe projecting out of the heat exchange element is fitted with a collar of PVC tubing sufficiently long to prevent in use the copper from making contact with buffer solution: The open face of the heat exchange element is then placed adjacent one of the gel cell plates and a leakproof joint between the heat exchange element and the cell is effected by spreading a film of Apiezon 101 grease over contacting surfaces for temporary joints or by cementing together contacting surfaces, with a semi-rigid cement, for permanent joints. Advantageously, there are used two heat exchange elements, one adjacent each plate of the gel cell, and there may be used a plurality of alternately arranged gel cells and heat exchange elements.

Considering now an arrangement comprising one gel cell and a heat exchange element adjacent each plate of the cell, such an arrangement is fitted into a bracket 12, which is then placed into compartment 4 of tank 1 in the position shown by the broken lines in FIG. 1. The bracket 12, the gel cell and the heat exchange elements are held firmly in place by four bolts (not shown) screwed into four threaded holes 13, the ends of which bolts abut the bracket 12. The side members of the bracket 12 are machined such that the ends thereof just fail to contact the partition 5 with the bolts screwed up fully, and the small gap therebetween is sealed by pouring in molten petroleum jelly and allowing to cool. The upper region of the bracket 12 and the top surfaces of the gel cell and of the heat exchange elements therefore define an upper buffer tank which is in direct communication with the compartment 3 via the slotted aperture 14. Joints in the upper buffer tank may be made watertight with petroleum jelly.

The assembled apparatus is prepared for use by introducing into the compartment 4 sufficient buffer solution to contact the lower surface of the gel. During this operation one end of the tank is slightly raised to prevent air from becoming trapped between the gel surface and the buffer solution. Buffer solution is then introduced into compartment 3 until an amount thereof has overflowed through the aperture 14 into the upper buffer tank to fill the latter to a depth of about 7 mm above the top of the cell plates. Sample compartments are formed in the top of the gel cell by introducing between the plates of the cell short lengths of silicon rubber tubing so that the bottom ends thereof contact the gel surface.

As many as, for example, 16 samples can be run on a single gel, the compartment-width in such a case being about 10 mm. The width of the sample compartments may be varied and the apparatus can be adapted to run simultaneously a very large number of samples by having two or more gel cells separated by additional heat exchange elements, as mentioned above. When more than one heat exchange element is used they may be connected in series by short lengths of flexible rubber tubing fitted over the copper pipes and pushed down so as to meet the PVC collars. Tubing which may be subject to crimping may be prevented from doing so by inserting into the bore thereof a short spiral of 0.5 mm diameter copper wire. In use, water from a bath of slush ice is circulated through the heat exchange elements by a suitable pump and the flow rate of the cooling water is adjusted such that the difference between the inlet and outlet water temperatures is less than 2°C.

The samples to be tested are introduced into the sample compartments 5 mm above the gel surface using a microsyringe. A safety lid is then placed on top of the tank 1, the electrodes 2 are connected to a suitable DC power supply and a low current is passed for a time sufficient to allow each sample to pass completely into the gel layer. The current is then switched off, the safety lid is removed and the lengths of silicone rubber tubing are quickly withdrawn. The lid is then replaced and the desired current is passed until electrophoretic separation is complete.

On termination of the run, the bracket 12, the gel cell and the heat exchangers are transferred to cold water and the gel layer is removed and is developed in the normal manner.

The hereabove described gel cell facilitates revoval of the gel layer for fixing and staining and the gel layer, being both thin and regular, is suitable for densiometric examination, and the above-described provision of two heat exchange elements adjacent the gel cell results in efficient cooling of the gel layer.

I claim:

1. Vertical gel electrophoresis apparatus comprising a rectangular buffer tank divided into a first compartment and a second compartment by a vertical partition extending upwardly from the base of the tank and wholly across the tank in a plane parallel to two opposite side walls thereof, the first compartment containing a lower buffer tank in which is vertically disposed a gel cell, the lower surface of the gel cell being directly contactable over its whole area with a buffer solution containable within the lower buffer tank, and an upper buffer tank defined by four walls, one of the four walls being a portion of the partition, and at least part of the bottom of which upper buffer tank is defined by the upper surface of the gel cell, means for allowing a buffer solution in the second compartment to overflow into the upper buffer tank and, disposed in each compartment, an electrode for establishing a potential across the gel cell.

2. Apparatus according to claim 1 which also comprises one or more heat exchange elements.

3. Apparatus according to claim 2 wherein a heat exchange element is provided adjacent each side of the gel cell.

* * * * *